United States Patent [19]

Berry

[11] Patent Number: 4,715,896

[45] Date of Patent: Dec. 29, 1987

[54] CEMENTITIOUS BINDER FOR CONSOLIDATED FILL

[75] Inventor: William A. Berry, Burlington, Canada

[73] Assignee: Standard Slag Cement, Toronto, Canada

[21] Appl. No.: 892,445

[22] Filed: Aug. 4, 1986

[51] Int. Cl.⁴ .......................... C04B 7/14; C04B 7/02; C04B 2/02

[52] U.S. Cl. ...................................... 106/117; 106/97; 106/118; 106/DIG. 1

[58] Field of Search .................... 106/97, 117, 118, 89, 106/98, DIG. 1

[56] References Cited

U.S. PATENT DOCUMENTS

| | | | |
|---|---|---|---|
| Re. 30,943 | 5/1982 | Nicholson | 106/118 |
| 2,446,990 | 8/1948 | Schuetz | 106/97 |
| 3,565,648 | 2/1971 | Mori et al. | 106/117 |
| 4,018,617 | 4/1977 | Nicholson | 106/118 |
| 4,038,095 | 7/1977 | Nicholson | 106/118 |
| 4,050,261 | 9/1977 | Brewer et al. | 106/97 |
| 4,050,950 | 9/1977 | Brewer et al. | 106/DIG. 1 |
| 4,354,876 | 10/1982 | Webster | 106/118 |
| 4,374,672 | 2/1983 | Funston et al. | 106/DIG. 1 |

FOREIGN PATENT DOCUMENTS 217662 12/1984 Japan.

OTHER PUBLICATIONS

Abstract of Japanese patent 217662, Noda Plywood Mfg KK, Derwent Publications 1985.
ASTM Designation C-618-85, Aug. 1985.
CSA Standard CAN 3-A.23.5-M82-p10, Jun. 1982.

Primary Examiner—William R. Dixon, Jr.
Assistant Examiner—Anthony J. Green
Attorney, Agent, or Firm—Ridout & Maybee

[57] ABSTRACT

Cementitious binder for consolidated fill comprises: (a) about 55 to 97 parts by weight of finely divided water-hardenable cementitious iron blast furnace slag; (b) about 3 to about 45 parts by weight of Class C fly ash; and (c) an alkaline activator elevating the pH of the composition above about 11 in the presence of water, said catalyst being selected from the group consisting of strongly basic alkali metal and alkaline earth metal hydroxides in an amount of about 2 to about 15% by weight based on the total weight of said slag plus said fly ash and normal portland cement powder in an amount of about 3 to about 25% by weight based on the total weight of said slag plus said fly ash.

8 Claims, No Drawings

CEMENTITIOUS BINDER FOR CONSOLIDATED FILL

The present invention relates to a cementitious binder for consolidated fill. By "consolidated fill" is meant a hardened mass composed of aggregate bound together with set cementitious paste providing a relatively low 28-day compressive strength and hence well-adapted for use for non-structural purposes e.g. back fill in mine excavations, sludge stabilization, conduit pipe surround and the like.

It is known to use portland cement powder as the cementitious binder in such non-structural fill. However, even where large quantities of water are blended with the cement powder to achieve increased water/cement ratios, in order to reduce the 28-day compressive strength to desired low values of typically no more than about 15 MPa, the cost of the portland cement powder per unit volume of the consolidated fill is undesirably high.

Economies can be achieved by using cementitious iron blast furnace slag in place of normal portland cement powder. However, at the same water/cement ratios this gives a fraction or percentage of the 28-day strength of the portland cement and therefore greater concentrations of the slag cement need to be employed. Even though some cost reduction can be achieved, the cost of the slag cement material is still significantly high. Applicant has now found unexpectedly that cementitious compositions comprising admixtures of slag cement, Class C fly ash and alkaline activator in certain proportions provide 28-day strengths significantly greater (typically about 33% greater) than those achievable with pure slag cement and which are more comparable with those achieved with normal portland cement, with considerable economy, since fly ash is generally considered to be cheaper than portland cement or slag. The 28-day strengths achieved are surprising since additions of alkaline activator to the cementitious slag material alone produce mixtures offering reduced compressive strengths on curing. Further, the 28-day strengths achieved with the compositions of the invention are surprisingly greater than those achieved with mixtures of the fly ash and the alkaline activator, or those that would be expected from combinations of these two mixtures.

The invention provides a water-hardenable cementitious binder composition for consolidated fill comprising in admixture:

(a) about 55 to 97 parts by weight of finely divided water-hardenable cementitious iron blast furnace slag;

(b) about 3 to about 45 parts by weight of Class C fly ash; and (c) an alkaline activator elevating the pH of the composition above about 11 in the presence of water, said catalyst being selected from the group consisting of strongly basic alkali metal and alkaline earth metal hydroxides in an amount of about 2 to about 15% by weight based on the total weight of said slag plus said fly ash and normal portland cement powder in an amount of about 3 to about 25% by weight based on the total weight of said slag plus said fly ash.

Finely divided water-hardenable cementitious iron blast furnace slag, as is known in itself, comprises slag of selected chemical composition which is vitrified, i.e. is rapidly cooled from the molten state by, for example, being rapidly quenched in water, pelletized, and ground, usually to about 80% to about 95% by weight passing 45μ or 325 mesh (Tyler Standard) sieve. If the molten slag is allowed to cool slowly so that it crystallizes, or if it is not ground to the appropriate fineness, the resulting material exhibits little or no attainment of compressive strength or water-hardenable cementitious property. The cementitious material should desirably conform to ASTM standard C595 Type S (with no additions), or, in Canada, CSA standard A363.

Class C fly ash (in Canada Type C fly ash) is the finely divided residue that results from the combustion of ground or powdered coal originating from the Rocky Mountains regions of North America. Also known is Class F fly ash (in Canada Type F fly ash) which results from the combustion of ground or powdered coal originating from the Appalachian regions of North America. Such Class F or Type F material, however, does not yield compositions of adequate compressive strength if substituted for the Class C or Type C material in the composition of the present invention.

Generally, compositions employing ratios of the cementitious slag material to the Class C or Type C fly ash material much less than about 55:45 by weight or much greater than about 97:3 by weight do not achieve adequate compressive strengths for the non-structural purposes for which the compositions of the present invention are intended, at least at water/cement ratios which provide acceptable handling characteristics. Superior compressive strengths at desirable water/cement ratios can be achieved with ratios of cementitious slag material to the fly ash of from about 60:40 to about 95:5, still more advantageously from about 85:15 to about 95:5, by weight.

The alkaline activator employed in the present compositions may be any alkali metal or alkaline earth metal hydroxide compatible with the remaining ingredients of the composition that elevates the pH of the composition in the presence of water above the normally alkaline pH of the cementitious slag material (normally at least about 11 and more usually at least about 12), and more preferably above about pH 13. The nature of the cementitious reaction which takes place between the cementitious slag material and the fly ash in the presence of the activator is not at present fully understood, but requires elevation of the pH of composition to an alkaline pH above that of the cementitious slag material, and, in the case in which the alkaline activator is an alkali metal or alkaline earth metal hydroxide a quantity of at least about 2% by weight of the hydroxide is to be employed since compositions containing less than about 2% by weight exhibit significantly decreased compressive strengths. With contents of the hydroxide activator greater than about 15% by weight based on the total weight of the cementitious slag material plus the fly ash, the compressive strengths can tend to decrease, or at least are not increased as compared with compositions containing lesser quantities of the activator. Accordingly, for reasons of reducing the quantity of the activator that needs to be provided in the compositions and in order to achieve desired compressive strengths, amounts of less than about 15% by weight of the alkali metal or alkaline earth metal hydroxide activator (based on the weight of cementitious slag material plus fly ash) should be used in the present compositions. Especially satisfactory compressive strengths at desirable water/cement ratios are achieved with contents of the hydroxide activator of from about 3 to about 10%, more advantageously about 4 to about 8% by weight based on the total weight of cementitious slag material plus the fly ash.

Examples of alkali metal hydroxides include lithium, sodium, potassium, rubidium, etc., hydroxides. Examples of alkaline earth metal hydroxides, wherein "alkaline earth metal" herein includes magnesium, are calcium, strontium, magnesium, etc. hydroxides. Preferably, since the alkaline earth metals tend to produce insoluble silicates and like insoluble reaction compounds in the course of the curing reaction, the activator is an alkaline earth metal hydroxide such as calcium or magnesium hydroxide. The alkali metal hydroxides such as sodium hydroxide have the disadvantage that they tend to produce soluble compounds such as silicates in the course of curing of the present compositions and therefore may give rise to problems of solubles leaching from the cured compositions in use. Desirably the activator is calcium hydroxide because of its wide availability at low cost and its ready formation of insoluble compounds during the curing reaction. The alkaline activator may be employed in dry powder form or in the form of an aqueous solution or slurry, and may for example be a calcium hydroxide containing slurry having a calcium hydroxide solids content of about 25% based on the weight of the slurry and a pH of about 13 obtained as a waste product or by-product from various industrial processes.

In place of the alkali metal or alkaline earth metal hydroxide, normal portland cement powder may be employed as the alkaline activator, since normal portland cement comprises about 60% by weight calcium hydroxide. Accordingly the normal portland cement powder may be employed in amounts of about 3 to about 25%, preferably about 5 to about 20%, more preferably about 5 to 15%, by weight based on the total weight of the cementitious slag material plus the fly ash, in order to achieve deserved compressive strengths at desired water/cement ratios. The use of normal portland cement powder is not preferred, however, because it increases the cost of the compositions.

In manufacture of the compositions of the invention, a mixture of the finely divided cementitious slag material and the fly ash is prepared. In the case in which the alkaline activator material is in dry form, the activator material may be mixed together with the cementitious slag material and the fly ash during manufacture of the composition, in which case the user needs to add water only in order to obtain hardening of the composition. Alternatively, the activator material in dry form may be mixed together with the water and the cementitious slag material and the fly ash at the site where the composition is to be used. In the case in which the alkaline activator is in the form of an aqueous slurry, the activator material needs to be mixed with the other components of the composition at the site where it is to be used. In use, the mixture is employed in the same manner as conventional portland cement powder and is mixed with aggregate and water, desirably in a water/cement ratio of about 0.4:1 to about 0.5:1 by weight, more preferably about 0.45:1 to about 0.47:1 in order to achieve a slurry comprising cementitious paste and aggregate of desired handling characteristics. By "water/cement" ratio herein is meant the ratio by weight of water to the total weight of the binder composition cementitious solids namely, the cementitious slag material plus the fly ash, and does not include the weight of alkaline activator solids. The cementitious paste undergoes a curing reaction and reaches a major percentage of, typically about 80%, of its ultimate compressive strength by 28 days. In the case in which the activator is employed in the form of an aqueous slurry, normally this is mixed with cementitious slag material and fly ash shortly before pouring and use of the mixture. In either case, in preparing a mixture of the cementitious slag material with the fly ash, the mixture may be interground or interblended, optionally together with the alkaline activator in the case in which this is present in dry form. In the former case, pieces of the vitrified slag material e.g. of ¼ inch or smaller particle size may be ground together with the fly ash in a mill or other size reduction apparatus, for example a ball mill, until the slag material is reduced to the preferred particle size range. Preferably, the pre-ground or otherwise finely divided cementitious slag material is merely blended with the fly ash in a blending apparatus, for example in a conventional cement mixer.

In order to more fully describe the present invention, by way of non-limiting example only, some specific compositions will be described.

In the following, all compressive strengths were determined at water/cement weight ratios of 0.46:1 except where noted, using test method ASTM C-150 (Canadian CSA A5) on 50 mm cubes.

"Blaine" refers to fineness in $m^2/kg$ and "flow" to the measure of spread under restricted vibration, both determined in accordance with ASTM C-150 (Canadian CSA A5).

Interground mixtures were prepared by grinding ¼ inch minus vitrified slag in admixture with the fly ash in a ball mill until the slag particles were reduced in size to 92% passing 45 μ mesh. All percentages are by weight.

The calcium hydroxide employed was a commercially available water and calcium hydroxide slurry. However, powdered calcium hydroxide ground to the usual commercial fineness may be used.

Interblended mixtures were blended in a conventional cement mixer.

COMPARATIVE EXAMPLES 1 TO 3

Type F fly ash was blended with various weights of calcium hydroxide, as indicated in Table 1 below, wherein the percentages are percentages by weight based on the weight of fly ash. The resulting blend was mixed with water and the compressive strengths were determined as mentioned above.

The Type F fly ash exhibited no significant strength or strength gain over a 28-day curing period, with or without the additions of the calcium hydroxide, as seen in Table 1 below.

TABLE 1

| Comparative Example No. | Fly Ash Type | % Ca(OH)$_2$ | Compressive strengths (mPa) | | |
|---|---|---|---|---|---|
| | | | 7 day | 14 day | 28 day |
| 1 | F | 0 | 0.26 | 0.35 | 0.43 |
| 2 | F | 3.5 | 0.31 | 0.43 | 0.56 |
| 3 | F | 5.0 | 0.35 | 0.43 | 0.52 |

COMPARATIVE EXAMPLES 4 TO 6

Comparative Examples 1 to 3 were repeated using Type C fly ash instead of the Type F fly ash. The results are shown in Table 2. The Type C fly ash showed a progressive strength increase from 7 to 28 days after pouring. At 28 days, significant increases in compressive strengths were achieved with mixtures containing additions of 3.5% and 5.0% Ca(OH)$_2$ as compared with a mixture containing no Ca(OH)$_2$.

TABLE 2

| Comparative Example No. | Fly Ash Type | % Ca(OH)$_2$ | Compressive strengths (mPa) | | |
|---|---|---|---|---|---|
| | | | 7 day | 14 day | 28 day |
| 4 | C | 0 | 3.54 | 4.18 | 4.57 |
| 5 | C | 3.5 | 4.14 | 9.49 | 9.63 |
| 6 | C | 5.0 | 4.18 | 8.45 | 11.77 |

COMPARATIVE EXAMPLES 7 TO 9

Comparative Examples 1 to 3 were repeated using a cementitious iron blast furnace slag powder in place of the fly ash. The cementitious slag material was obtained from Standard Slag Cement, a Standard Industries Company, Fruitland, Ontario, Canada, L0R 1L0, and had been ground to 92% by weight passing 45 μ mesh.

It was found the additions of lime to the ground slag powder resulted in decreased compressive strengths, as shown in Table 3 below.

TABLE 3

| Comparative Example No. | Cementitious Material | | Blaine | Flow | W/C$^c$ | Compressive Strengths (mPa) | | |
|---|---|---|---|---|---|---|---|---|
| | | | | | | 7 day | 14 day | 28 day |
| 7 | 100% S.C.$^a$ | 0% L$^b$ | 444 | 114 | .468 | 9.6 | 12.8 | 15.2 |
| 8 | 100% S.C. | 3.5% L | 444 | 109.5 | .468 | 4.4 | 5.3 | 6.5 |
| 9 | 100% S.C. | 5.0% L | 444 | 106.0 | .468 | 4.9 | 5.7 | 7.2 |

Notes:
$^a$S.C. = slag cement
$^b$L = Ca(OH)$_2$
$^c$W/C = water/cement weight ratio

EXAMPLES 10 to 12

Comparative Examples 1 to 3 were repeated using in place of the fly ash a mixture obtained by intergrinding 95 parts by weight of the cementitious slag material of comparative Examples 7 to 9 with 5 parts by weight Type C fly ash (obtained from Detroit Edison, Port Huron, Mich., U.S.A.). In the absence of calcium hydroxide, the interground mixture achieved substantially no compressive strength. The mixtures containing 3.5% and 5.0% by weight calcium hydroxide, based on the total weight of the cementitious slag material plus the fly ash achieved satisfactory 28-day compressive strengths above 15 mPa, as shown in Table 4 below.

TABLE 4

| Example No | Cementitious Material | | Blaine | Flow | W/C$^c$ | Compressive Strengths (mPa) | | |
|---|---|---|---|---|---|---|---|---|
| | | | | | | 7 day | 14 day | 28 day |
| 10 | 95 parts S.C.$^a$ — 5 parts F.A.$^d$ | 0% L$^b$ | 413 | 115 | 0.456 | 0.09 | 0.09 | 0.13 |
| 11 | 95 parts S.C. — 5 parts F.A. | 3.5% L | 413 | 109.5 | 0.468 | 10.7 | 13.8 | 16.3 |
| 12 | 95 parts S.C. — 5 parts F.A. | 5.0% L | 413 | 113.0 | 0.462 | 9.7 | 13.0 | 15.8 |

Notes:
$^a$S.C. = slag cement
$^b$L = Ca(OH)$_2$
$^c$W/C = water/cement weight ratio
$^d$F.A. = fly ash

EXAMPLES 13 TO 15

Comparative Examples 1 to 3 were repeated using in place of the fly ash a mixture obtained by interblending 95 parts by weight of the cementitious slag material of Comparative Examples 7 to 9 ground to 80% passing 45 μ sieve with 5 parts by weight of the Type C fly ash of Examples 10 to 11.

TABLE 5

| Example No. | Cementitious Material | | Blaine | Flow | W/C$^c$ | Compressive Strengths (mPa) | | |
|---|---|---|---|---|---|---|---|---|
| | | | | | | 7 day | 14 day | 28 day |
| 13 | 95 parts S.C.$^a$ — 5 parts F.A. | 0% L$^b$ | 441 | 110.0 | 0.460 | 0.1 | 0.1 | 0.2 |
| 14 | 95 parts S.C. — 5 parts F.A. | 3.5% L | 441 | 111.5 | 0.464 | 9.7 | 13.0 | 15.1 |
| 15 | 95 parts S.C. — 5 parts F.A. | 5.0% L | 441 | 110.5 | 0.462 | 9.7 | 13.6 | 15.7 |

Notes:
$^a$S.C. = slag cement
$^b$L = Ca(OH)$_2$
$^c$W/C = water/cement weight ratio
$^d$F.A. = fly ash As will be seen by comparison of the compressive strengths achieved in Examples 10 and 13 with those of Comparative Example 7, in the absence of an alkaline activator, the pressure of the fly ash interferes with the development of compressive strength of the cementitious slag material.

EXAMPLES 16 TO 20

Example 15 was repeated using interblends of the cementitious slag material and the Type C fly ash in various proportions, admixed with 5% by weight of lime based on the total weight of the cementitious slag material plus the fly ash. The poured and cast mixtures offered the 28-day strengths shown in Table 6.

TABLE 6

| Example No. | Cementitious Material Parts by weight | | Blaine | Flow | W/C$^c$ | Compressive Strength (mPa) 28-day |
|---|---|---|---|---|---|---|
| | S.C.$^a$ | F.A.$^d$ | | | | |
| 16 | 90 | 10 | 439 | 114 | 0.470 | 23.4 |
| 17 | 80 | 20 | 435 | 108 | 0.440 | 21.0 |
| 18 | 70 | 30 | 430 | 110 | 0.430 | 19.4 |
| 19 | 60 | 40 | 426 | 108 | 0.420 | 12.4 |
| 20 | 50 | 50 | 421 | 106 | 0.410 | 3.8 |

Notes:
$^a$S.C. = slag cement
$^b$L = Ca(OH)$_2$
$^c$W/C = water/cement weight ratio
$^d$F.A. = fly ash

EXAMPLES 21 TO 25

Interblends were made comprising 90 parts by weight of the ground cementitious slag powder used in Examples 13 to 20 and 10 parts by weight of the Type C fly ash used in Examples 10 to 20, with various additions of lime, in the percentages by weight shown in Table 7 below, based on the total weight of the slag powder plus fly ash. The 28-day compressive strengths shown in the Table were achieved by the poured and cast mixtures.

TABLE 7

| Example No | % by weight L$^b$ | Blaine | Flow | W/C$^c$ | Compressive Strength (mPa) 28-day |
|---|---|---|---|---|---|
| 21 | 2.5 | 440 | 115 | 0.467 | 17.5 |
| 22 | 3.5 | 440 | 112.5 | 0.458 | 19.8 |
| 23 | 5.0 | 440 | 106 | 0.460 | 23.3 |
| 24 | 7.5 | 440 | 105 | 0.460 | 23.9 |
| 25 | 10.0 | 440 | 105 | 0.480 | 22.5 |

Notes:
$^a$S.C. = slag cement
$^b$L = Ca(OH)$_2$
$^c$W/C = water/cement weight ratio
$^d$F.A. = fly ash

I claim:

1. A water-hardenable cementitious material for consolidated fill comprising in admixture an aggregate suitable for use in consolidated fill and a binder the binder, consisting essentially of:
   (a) about 55 to 97 parts by weight of finely divided, water-hardenable, vitrified, cementitious, iron blast furnace slag;
   (b) about 3 to about 45 parts by weight of Class C fly ash; and
   (c) an alkaline activator elevating the pH of the composition above about 11 in the presence of water, the activator being calcium hydroxide in an amount of about 2 to about 15% by weight based on the total weight of said slag plus said fly ash.

2. A cementitious material according to claim 1 comprising about 60 to about 95 parts by weight of said slag and about 5 to about 40 parts by weight of said fly ash.

3. A cementitious material according to claim 2 comprising about 85 to about 95 parts by weight of said slag and about 5 to 15 parts by weight of said fly ash.

4. A cementitious material according to claim 1 wherein said activator is present in an amount of about 3 to about 10% by weight, based on the total weight of said slag plus said fly ash.

5. A cementitious material according to claim 4 wherein said activator is present in an amount of about 4 to about 8% by weight, based on the total weight of said slag plus said fly ash.

6. A cementitious material according to claim 1 wherein said slag comprises about 80% to about 95% by weight passing 45 μ sieve.

7. A cementitious slurry comprising cementitious material according to claim 1 mixed with water present in a weight ratio to the total weight of said slag plus said fly ash of about 0.4:1 to about 0.5:1.

8. A cementitious material according to claim 7 wherein said ratio is about 0.45:1 to about 1.47:1.

* * * * *